US006404787B1

(12) United States Patent
Unternahrer et al.

(10) Patent No.: US 6,404,787 B1
(45) Date of Patent: Jun. 11, 2002

(54) METHOD AND APPARATUS TO SELECT A PREDETERMINED NUMBER OF PULSES FROM A LASER

(75) Inventors: Josef Robert Unternahrer, Niskayuna; Carl Edward Erikson, Schenectady; Marshall Gordon Jones, Scotia, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/518,200

(22) Filed: Mar. 3, 2000

Related U.S. Application Data

(60) Provisional application No. 60/171,412, filed on Dec. 21, 1999.

(51) Int. Cl.[7] .................................................. H01S 3/10
(52) U.S. Cl. .............................. 372/25; 372/29; 372/38
(58) Field of Search .............................. 372/25, 29, 38; 250/214 B

(56) References Cited

U.S. PATENT DOCUMENTS

| 5,010,341 A | | 4/1991 | Huntley et al. |
| 5,347,120 A | * | 9/1994 | Decker et al. |
| 5,553,042 A | | 9/1996 | Usui |
| 5,964,749 A | | 10/1999 | Eckhouse et al. |

* cited by examiner

Primary Examiner—Leon Scott, Jr.

(57) ABSTRACT

A method and apparatus of selecting a predetermined number of pulses from a stream of laser pulses is described. The number of pulses is determined by the operator from the laser pulse repetition rate and the desired number of pulses. The invention comprises synchronizing the laser pulses with the start of the pulse selection, allowing the predetermined count of laser pulses to pass a blocking mechanism; and finally blocking the pulses after the pulses have passed.

20 Claims, 2 Drawing Sheets

METHOD AND APPARATUS TO SELECT A PREDETERMINED NUMBER OF PULSES FROM A LASER

CROSS REFERENCE TO RELATED APPLICATIONS

The present application is a utility application of our provisional application, serial No. 60/171,412, filed Dec. 21, 1999 entitled "Method and Apparatus to Select a Predetermined Number of Pulses from a Laser," currently pending attorney docket number RD-26978).

BACKGROUND OF THE INVENTION

The present invention generally relates to the field of pulsed laser control. More specifically, the present invention describes an external apparatus and method adaptable to most lasers for selecting a predetermined number of laser pulses.

During material processing with lasers it is often necessary to apply a single pulse or a low number of pulses to a spot of the device or material being treated. In principle, this could be done by firing the laser from an external trigger when a pulse is required (single pulse operation). However, most lasers, especially high power lasers, are designed such that the thermal focal power of the gain medium (i.e., the laser rod or slab) is part of the laser resonator. When the laser is turned on it takes several shots for this focal power to develop and for the resonator to function properly. During these first few pulses the output energy and spatial profile of the laser beam are unpredictable. Obviously, the same problem arises when the laser is run in single pulse operation. Hence, single pulse operation is not an option when, as in many critical applications, well characterized laser pulses are required. In addition, to generate the current pulses for the lamp(s), conventional laser power supplies typically use a "pulse-forming network" (PFN) that is charged from a reservoir capacitor bank with a technique called "resonance charging." This technique also requires a few pulses before the PFN produces reproducible current pulses. To overcome these problems, it is customary to have the laser running continuously in thermal and electrical steady-state, and to have the laser beam physically blocked. In the prior art, blocking of the laser beam is typically achieved inside the resonator for those lasers capable of limiting the number of pulses. It is advantageous to block the beam external to the resonator. With external blocking the energy is extracted from the gain medium to avoid uncontrolled parasitic oscillation. Further, lasers without the ability to limit the number of pulses require an external method of blocking the beam if they are to be made capable of limiting the number of pulses emitted. Then, when one or a few pulses are required, the operator manually removes the block for an appropriate amount of time and then blocks the beam again after the desired number of pulses has passed. This approach becomes less and less feasible as the pulse repetition rate of the laser increases. The repetition rate of the laser pulses at some point becomes too rapid for the operator to physically move a block and, at all repetition rates; it is possible that a partial pulse could be allowed to pass.

BRIEF SUMMARY OF THE INVENTION

The present invention discloses an apparatus and method that provides for the application of a predetermined number of lasers pulses in situations where manual operation is prohibited by physical limitations imposed by high repetition rate lasers. The approach, however, is not limited to high repetition rate lasers nor high power lasers. The approach can be applied to low repetition rate lasers and low power lasers as well. The disclosed invention can be fabricated as an external assembly to the laser and, therefore, adapted to lasers not having the ability to limit the pulses to a predetermined number.

The present invention is divided into three major blocks. In a first operation the initiation of the selection of pulses is synchronized with the operation of the laser. That is, initiation of the sequence for application of the laser pulse(s) is delayed until the advent of the next laser pulse. In this manner the timing of the second operation is aligned with the repetition rate of the laser.

The second operation begins with the occurrence of the first laser pulse after the initiation. In this operation, a delay generator allows laser pulses to pass for a duration of time predetermined by the number of laser pulses desired.

The third operation is the placement of a physical shutter that blocks or allows the laser pulses depending upon the status of the delay generator output of operation two.

A better understanding of the features and advantages of the present invention will be obtained by reference to the following detailed description of the invention and accompanying drawings, which set forth an illustrative embodiment in which the principles of the invention are utilized.

BRIEF DESCRIPTION OF THE DRAWINGS

The details of the invention will be described in connection with the accompanying drawings, in which.

DETAILED DESCRIPTION OF THE INVENTION

Figure 1:
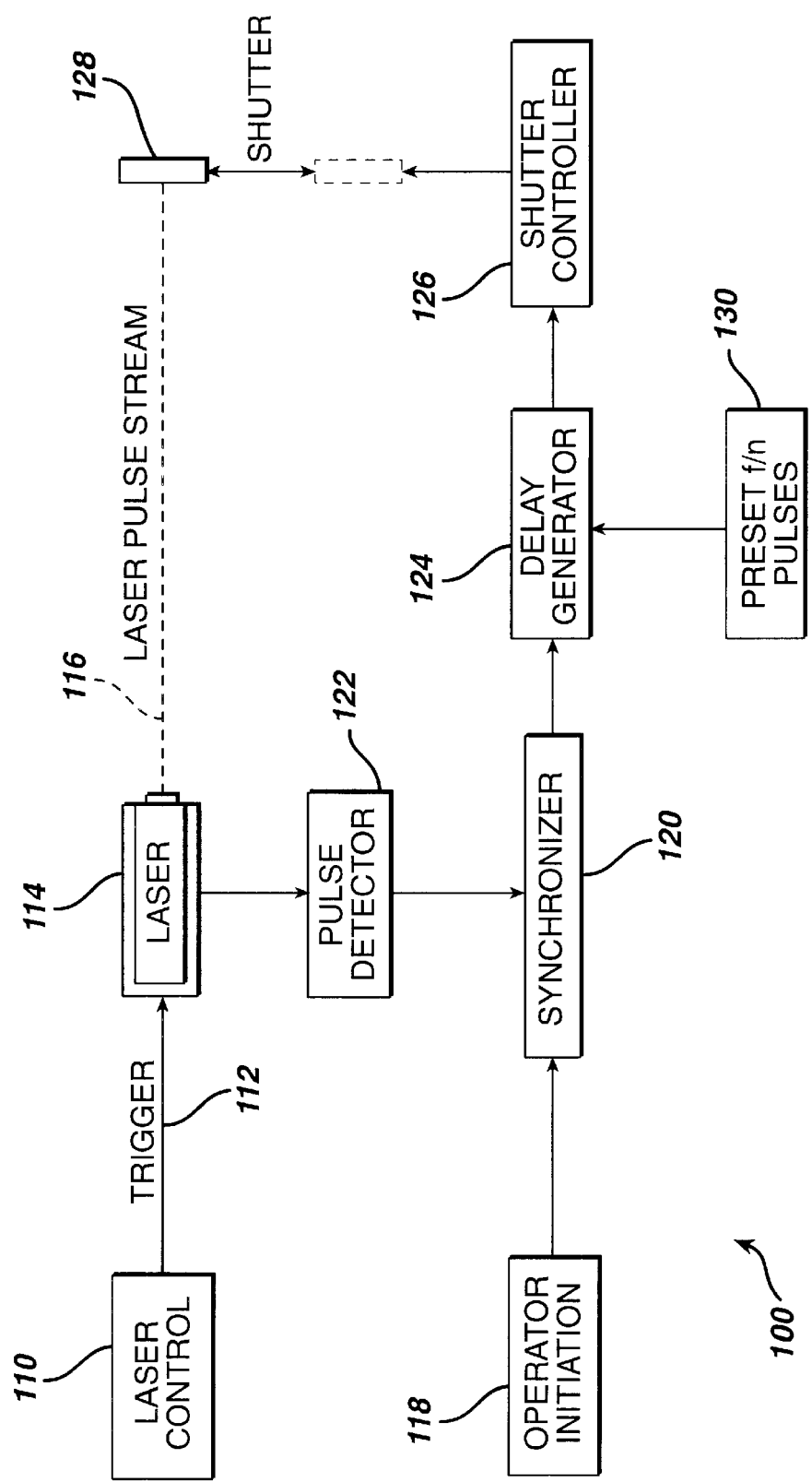
FIG. 1. Block diagram of the disclosed invention.

The relationship of the parts of the invention can be seen by referring to FIG. 1. wherein laser controller 110 generates a trigger signal 112 that causes a laser 114 to emit a laser pulse from a stream of laser pulses 116. A pulse detector 122 detects the occurrence of the laser pulses 116 and thereupon generates a first signal to a synchronizer 120. Initiation of the invention occurs at a box 118 (operation initiation may be through a human operator or a non-human operator, such as a machine tool after it determines that a workpiece is in proper position to receive laser pulse treatment), which generates a second signal to the synchronizer circuit 120 to await the occurrence of a next laser pulse from the laser pulse stream 116. At the occurrence of the first laser pulse detected by the pulse detector 122 after initiation 118, the synchronizer 120 issues a third signal to a delay generator 124. The delay generator 124 provides a timing pulse signal for a shutter controller 126 to move shutter 128 out of the path of the laser pulse stream 116 thereby allowing the laser pulse stream to reach a target (not shown). The delay generator 124 continues to provide the timing pulse signal for the shutter controller 126 until a predetermined number of pulses, n, preset by the operator at box 130 have passed by the shutter. The preset number of pulses, n, and the frequency of the laser pulses, f, determine the length of the delay generator timing pulse signal. The length of the delay generator timing pulse signal is n/f although any suitable counting method could be used to achieve the same purpose. After the delay generator has timed the predetermined number of laser pulses, the delay generator removes the timing pulse signal from the shutter controller and the shutter is caused to return to a position wherein the laser pulse stream 116 is again blocked.

Figure 2:
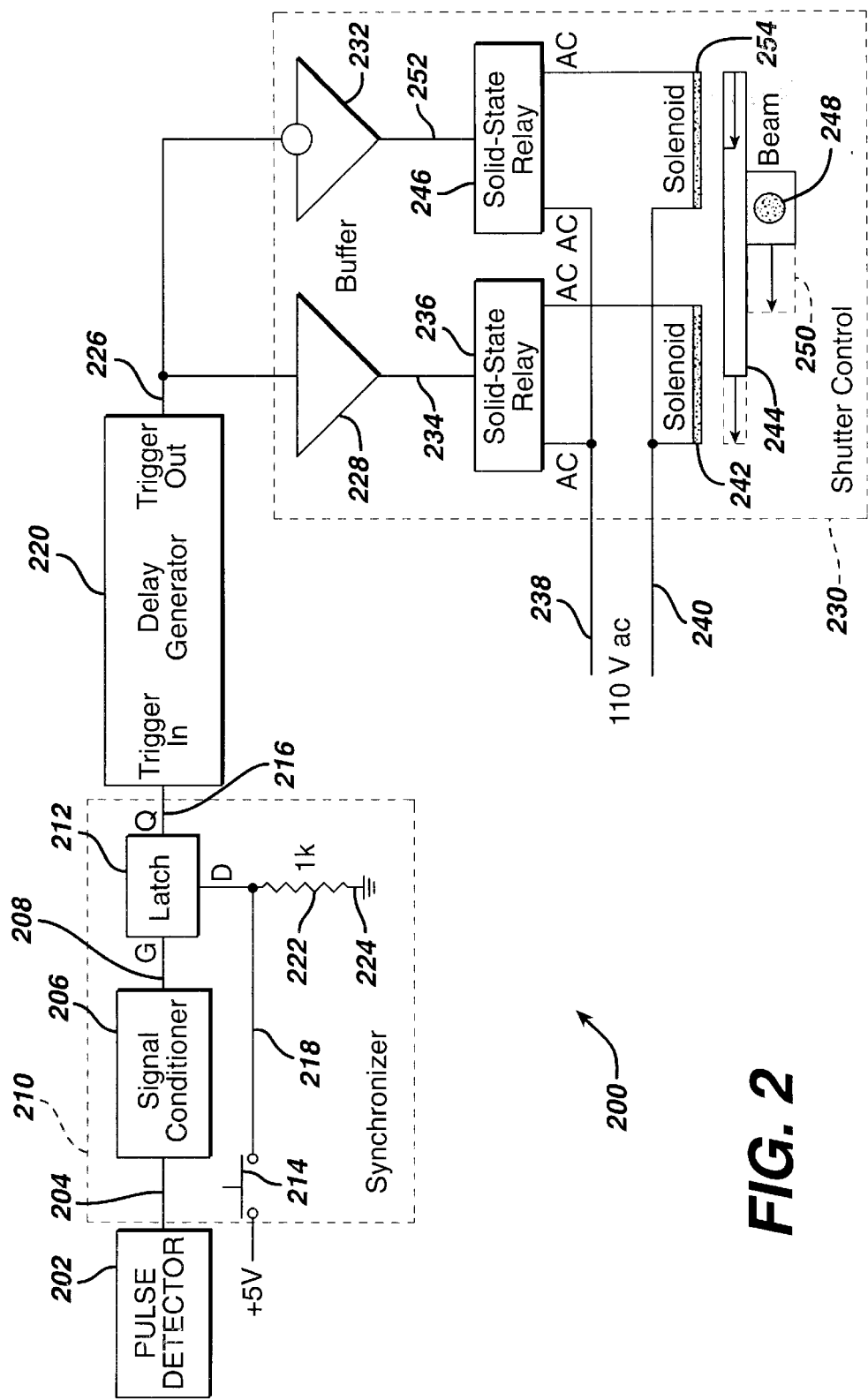
FIG. 2. Diagram of a method and apparatus to select a predetermined number of pulses from a laser.

The preferred apparatus and method for selecting a predetermined number of pulses from a stream of laser pulses is generally shown as 200 in FIG. 2. There are three parts to the invention: the first is a synchronizer 210, the second a delay generator 220, and the third a shutter controller 230.

The synchronizer 210 coordinates the initiation of the invention and the laser. A pulse detector 202 identifies the occurrence of a laser pulse and outputs a timing signal (first signal) on a line 204. The timing signal 204 can easily be generated if the laser power supply outputs an electrical signal of a fixed temporal relationship with the current pulse. The current pulse is generated by the power supply to instigate a laser pulse. Any of various other approaches can be used to detect the occurrence of a laser pulse if the electrical signal from the power supply is not available. For example, a current probe can be used to sense the flash lamp current. Alternatively, an optical detector, such as a light sensitive photodetector, can sense either the light from the flash lamps or the fluorescence from the gain medium. In a like manner, an optical detector can sense the laser beam 248 by detecting the scattered light from the beam shutter 250. In any case, a signal conditioner 206 is arranged to receive the pulse detector 202 output timing signal on line 204 and produce a pulse for a clock signal on a line 208. Thus the clock signal on line 208 represents the occurrence of a laser pulse and clocks a latch 212. An initiation device 214 is configured to generate a second signal, when activated, to enable setting of the latch 212 at the occurrence of the next clock pulse 208. Many initiation devices can be so arranged and a pushbutton is shown for illustration and not limitation. While any latch 212 circuitry can be used to accomplish this purpose, a simple D flip-flop is shown. The latch 212 output (third signal) on a line 216 is normally low. Latch output 216 remains low after each clock pulse 208 while latch D input on a line 218 is low. As long as the initiation device 214 is in the open position, the latch D input 218 is held low through the connection to a resistor 222 connected to a ground 224. Activation of the initiation device 214 imposes a logic high on latch D input 218. The next occurrence of a clock pulse 208 sets the latch output 216 to a logic high. The latch output 216 will remain high after each clock pulse 208 until the initiation device 214 is placed in the open position thereby causing a ground voltage level to appear on latch D input 218. The next clock pulse 208 will reset the latch output 216 to a logic low. Hence, the latch D input 218 reflects the state of the initiation device 214. The change in state of initiation device 214 reflected in the latch output 216 only at the occurrence of a clock pulse 208 that is present at a fixed time relative to the occurrence of a laser pulse. In this manner the operator activation of the initiation device 214 is synchronized with the laser pulses.

The second step consists of using a delay generator 220 to generate a timing pulse signal in response to the setting of the latch output 216 which is indicative of the operator activation of the initiation device 214 delayed so that the setting of the latch output 216 is synchronized with the occurrence of a laser pulse as described above. Latch output 216 is connected to trigger the delay generator 220 to start the timing pulse signal on a line 226. The timing pulse signal 226 is of a duration appropriate to let pass the desired number of laser pulses. That is, the timing pulse signal ends after the last of the predetermined number of laser pulses. Hence, the number of laser pulses desired and the pulse repetition rate of those pulses determine the duration of the timing pulse signal 226. Specifically, if n is the number of pulses selected and f [Hz] the repetition rate of the laser, the timing pulse signal duration is n/f seconds. The delay generator 220 can be designed in numerous ways including digital circuitry to count the predetermined pulses. In an exemplary embodiment a programmable delay generator, such as the DG 535 available from Stanford Research Systems, is used. In this embodiment the operator determines the delay time required and programs the delay generator prior to activation of the pushbutton switch.

The third step is a shutter control 230 for blocking the laser pulses except during the duration of the timing pulse signal 226 being at a logic high. One method of blocking the laser pulses is illustrated in FIG. 2 and consists of a beam shutter 250 that is physically interposed in the path of the laser pulse stream to block the pulses. A solenoid 242 is activated to cause unblocking of the laser pulse stream and a solenoid 254 is activated to cause blocking of the laser pulse stream by relay drivers 228 and 232, respectively. Various methods to avoid simultaneous activation of both solenoids in response to the timing pulse signal will be evident to those of ordinary skill in the art. In a preferred embodiment, the relay drivers are two buffers 228 and 232 both connected to the delay generator output timing pulse signal 226. Buffer 232 has an inverting input and buffer 228 does not. Therefore, the output of buffer 228 (fourth signal) and buffer 232 are always at opposite logic levels. Buffer 228 is connected to a solid-state relay 236 by a line 234. When activated during the duration of the timing pulse signal 226, solid-state relay 236 connects 110 Vac on lines 238 and 240 across a solenoid 242 causing the solenoid slug 244 to move in the direction shown and the beam shutter 250 disposed thereon to unblock the laser pulse output beam 248. Similarly, buffer 232 is connected to a solid-state relay 246 by a line 252. In the absence (logic low) of the timing pulse signal 226, solid-state relay 246 connects 110 Vac on lines 238 and 240 across a solenoid 254 causing the solenoid slug 244 to return to the original position and the beam shutter 250 disposed thereon to block the laser pulse output beam 248. In this manner, the laser pulse stream is unblocked by the shutter during the duration of the timing pulse signal and blocked at other times. The preferred embodiment uses two solenoids, one that pulls the shutter into, and one that pulls the shutter out of, the laser pulse stream. This affords high-speed operation in both directions. The use of two buffers always at opposite logic levels assures that the solenoids are never activated at the same time and the timing synchronization described above guarantees that, at the time a laser pulse occurs, the shutter is always either open or closed and no fractional pulses are passed through.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method of selecting a predetermined number of laser pulses from a stream of laser pulses, comprising:
   initiating a laser pulse selection sequence;
   synchronizing said starting with said stream of laser pulses;
   initiating a delay generator after said synchronizing with an output of said delay generator providing a timing pulse signal of a preset duration based on said predetermined number of laser pulses; and
   controlling passage of said predetermined number of laser pulses from said stream of laser pulses in response to said timing pulse signal.

2. The method of claim 1 wherein said synchronizing comprises:
   detecting said starting;
   sensing said laser pulses; and
   setting a latch at the occurrence of said sensing after said detecting.

3. The method of claim 1 wherein said initiating comprises:
   determining a pulse repetition rate of said laser pulse stream;
   determining a number of pulses desired from said laser pulse stream; and
   calculating said preset length of time of said timing pulse signal by dividing said number of laser pulses desired by said pulse repetition rate.

4. The method of claim 1 wherein said controlling comprises:
   blocking said stream of laser pulses;
   blocking said stream of laser pulses at the conclusion of said timing pulse signal.

5. The method of claim 3 wherein said unblocking comprises moving a shutter to unblock said stream of pulses upon start of said timing pulse signal.

6. The method of claim 3 wherein said blocking comprises moving a shutter to block said stream of laser pulses upon conclusion of said timing pulse signal.

7. An apparatus for selecting a predetermined number of laser pulses from a laser, comprising:
   a pulse detector that generates a first signal in response to the occurrence a laser pulse from said laser;
   an initiation device that generates a second signal in response to operator activation of said initiation device;
   a synchronizer coupled to said first and second signals that generates a third signal at the occurrence of said first signal after the occurrence of said second signal;
   a delay generator coupled to receive said third signal and initiate a timing pulse signal said timing pulse signal ending after a predetermined length of time;
   a shutter controller coupled to said timing pulse signal to generate a fourth signal at said initiation of said timing pulse signal and remove said fourth signal at the end of said timing pulse signal; and
   a shutter coupled to said shutter controller, wherein said shutter blocks said laser pulses from said laser, and unblocks said laser pulses from said laser in response to said initiation of said fourth signal and blocks pulses at the end of said fourth signal.

8. The apparatus of claim 7 wherein said pulse detector is a photodetector for detecting an optical signal and converting said optical signal into an electrical signal.

9. The apparatus of claim 7 wherein said pulse detector is a current probe arranged to sense a pulse of current and convert said pulse of current into an electrical signal.

10. The apparatus of claim 7 wherein said delay generator is a pulse counter.

11. The apparatus of claim 7 wherein said delay generator is a microcircuit.

12. The apparatus of claim 7 wherein said synchronizer comprises:
   a signal conditioner for receiving said first signal and generating a clock pulse; and
   a latch having a first input coupled to receive said clock pulse and change the state of said third signal in response to said clock pulse when there has been a change in state of said initiation device.

13. The apparatus of claim 12 wherein said latch is a D-type flip-flop.

14. The apparatus of claim 7 wherein said shutter further comprises:
   a slug upon which is mounted said shutter; and
   solenoids magnetically connected to said slug said solenoids capable of moving said slug in response to said timing pulse signal.

15. The apparatus of claim 14 wherein said shutter controller further comprises:
   a relay driver coupled to said delay generator for receiving said timing pulse signal and providing a fourth signal and a complement of said fourth signal;
   a first relay coupled to said fourth signal; and
   a second relay coupled to said complement of said fourth signal said first and second relays coupled to said solenoids, respectively.

16. The apparatus of claim 15 wherein said relay driver comprises:
   a first buffer coupled to said delay generator for receiving said timing pulse signal; and
   a second buffer coupled to said delay generator for receiving said timing pulse signal, said second buffer inverting said timing pulse signal, said first buffer providing said fourth signal and said second buffer providing a complement of said fourth signal.

17. The apparatus of claim 15 wherein said solenoids comprise:
   a first solenoid coupled to said fourth signal; and
   a second solenoid connected to said complement of said fourth signal whereby said first solenoid moves said slug in a direction to cause said shutter to unblock said pulses from said laser and said second solenoid moves said slug in a direction to cause said shutter to block said pulses from said laser.

18. An apparatus for selecting a predetermined number of laser pulses from a laser, comprising:
   a pulse detector means for sensing the occurrence of said laser pulse and generating a first signal when said laser pulse is sensed;
   an initiation means for generating a second signal and starting the selection of said predetermined number of pulses;
   a synchronizing means coupled to said pulse detect means and said initiation means for generating a third signal at the occurrence of said first signal after the occurrence of said second signal;
   a delay generator means coupled to said synchronizing means and providing a timing pulse signal in response to said third signal;
   a shutter controller means coupled to said delay generator means and generating a fourth signal in response to said third signal; and
   beam blocking means coupled to said shutter controller means and arranged to block said pulses from said laser in response to the occurrence of said fourth signal and unblock said pulses from said laser at the loss of said fourth signal.

19. A method of selecting a predetermined number of laser pulses from a stream of laser pulses, comprising:
   initiating a laser pulse selection sequence;
   synchronizing said starting with said stream of laser pulses;

initiating a delay generator after said synchronizing with an output of said delay generator providing a timing pulse signal based on detecting said predetermined number of laser pulses; and controlling passage of said predetermined number of laser pulses from said stream of laser pulses in response to said timing pulse signal.

20. The method of claim 19 wherein said timing pulse signal starts upon detection of a first one of said predetermined number of laser pulses after said synchronizing and wherein said timing signal concludes upon detection of a last one of said predetermined number of laser pulses after said synchronizing.

* * * * *